No. 656,816. Patented Aug. 28, 1900.
J. D. GRIFFEN.
TOBACCO MOISTENER.
(Application filed May 7, 1898.)

(No Model.)

Witnesses
J. G. Hinkel
N. E. Hay

Inventor
John D. Griffen
by
Foster & Freeman
Attorneys

THE NORRIS PETERS CO., PHOTO-LITHO., WASHINGTON, D. C.

UNITED STATES PATENT OFFICE.

JOHN D. GRIFFEN, OF NEW YORK, N. Y.

TOBACCO-MOISTENER.

SPECIFICATION forming part of Letters Patent No. 656,816, dated August 28, 1900.

Application filed May 7, 1898. Serial No. 680,020. (No model.)

*To all whom it may concern:*

Be it known that I, JOHN D. GRIFFEN, a citizen of the United States, residing at New York, in the county of New York and State of New York, have invented certain new and useful Improvements in Cigar-Moisteners, of which the following is a specification.

The object of my invention is to provide a detachable cigar-moistener which is adapted to be applied to any ordinary cigar-box and to keep the cigars contained in the box in good condition; and to these ends my invention consists in a cigar-moistener embodying the various features of construction and arrangement and adapted to be operated substantially in the manner hereinafter more particularly set forth.

Figure 1:
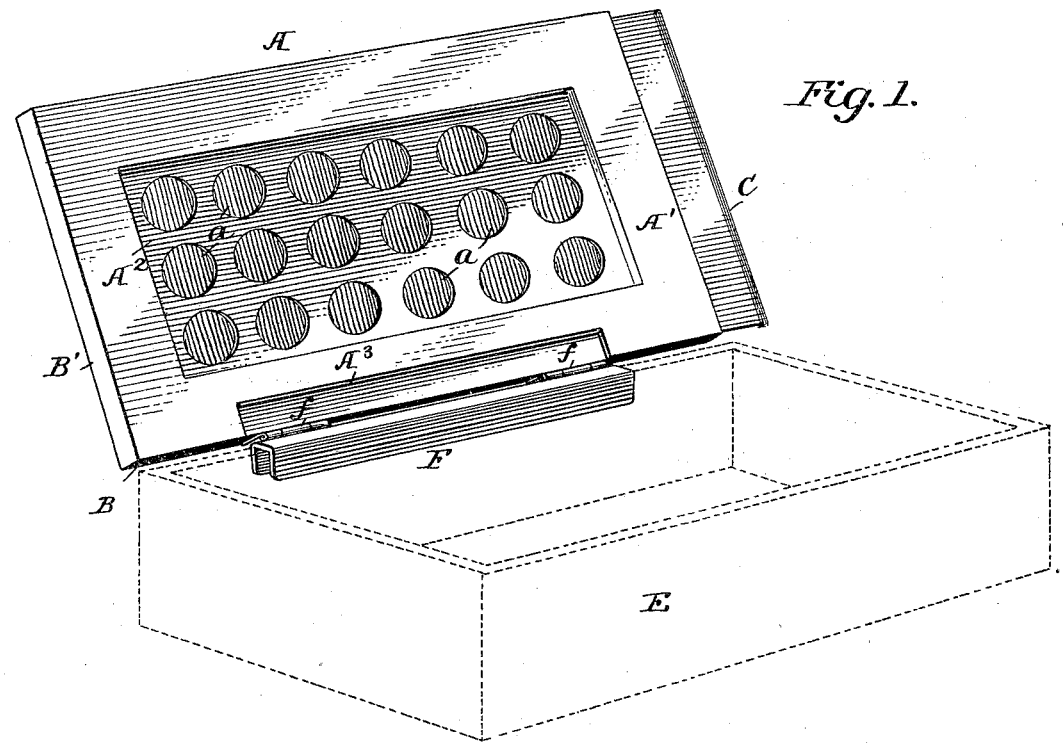
Figure 2:
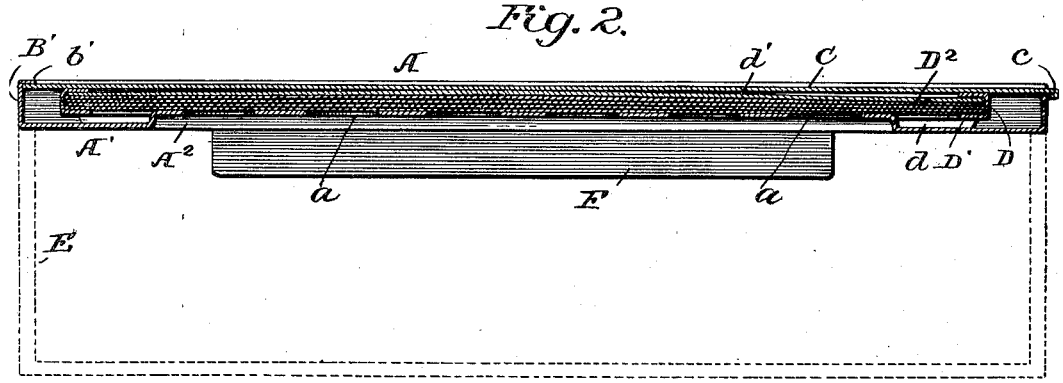
Figure 3:
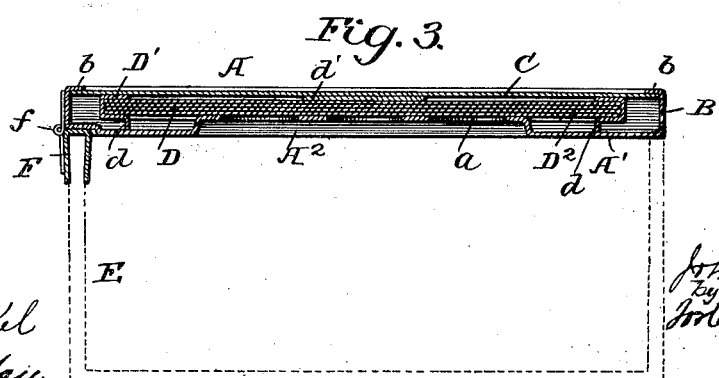

In the accompanying drawings, Figure 1 is a perspective view showing the detachable moistening-cover in position on a box. Fig. 2 is a longitudinal vertical section, and Fig. 3 is a transverse section.

It is desirable in order that cigars may be kept in the most satisfactory condition that they be kept moist, and various means have been suggested for accomplishing this result. The object of my invention is to provide a moistener which shall be self-contained and which besides acting as a moistener serves as a cover for the box or receptacle of cigars, to which box or receptacle the moistener or cover can be temporarily applied and removed and used over and over again in connection with fresh boxes of cigars. With such a device not only can the purchaser of a box of cigars with a single moistener keep his cigars in good condition, but a retailer can also use the moistener and at the same time comply with all the requirements of the law in regard to selling cigars. The combined cover and moistener may be variously constructed and may be provided with various means by which it can be attached to and detached from an ordinary cigar box or receptacle, so as to be repeatedly used, and my invention, broadly considered, is not limited to the specific construction and arrangement of the parts, but can be varied to suit the circumstances of any particular case. In the accompanying drawings, however, I have illustrated a preferred embodiment of my invention sufficient to enable it to be understood, and I will now proceed to describe its construction and arrangement.

The cover A is made of a size or shape to conform to the ordinary cigar-boxes or receptacles for containing cigars and is adapted to receive a moistening device or pad which is preferably detachably connected to the cover. In the present instance the cover is shown in the form of a rectangular receptacle, the bottom $A'$ of which has an indented panel $A^2$, provided with a number of openings $a$. The edges of the bottom $A'$ are turned up to form the sides B B and ends $B'$ $B'$, and the sides and one end are preferably formed with overhanging lips or projections $b$ $b'$ to receive a detachable top C, which is adapted to slide beneath and to be held in place by the ribs $b$ $b'$. One end of the top C is preferably provided with a turned-down lip or portion $c$ to form a convenient means for inserting and removing the top.

Within the top is arranged a pad containing some absorbent material, and this pad D is preferably detachable and in the present instance consists of a U-shaped frame $D'$, containing a number of sheets of blotting-paper $D^2$, forming the absorbent material. The frame $D'$ is provided with ribs or feet $d$, which rest upon the portion $A'$ of the bottom of the cover and are bent to support the pad above the perforated indented portion $A^2$. The sheets of absorbent material are thus confined at their edges in the U-shaped frame, and in order to prevent the sheets from swelling under the absorption of moisture, as well as to prevent tearing the sheets in moving the top, a strip or strips $d'$ extend over the top of the pad between the ends of the frame, so that the top can be adjusted in position without injury to the absorbent material.

Some means should be attached to the cover whereby it can readily be attached to a cigar-box, (indicated in dotted lines at E,) and while various means may be provided I have shown a clamp F in the form of a U-shaped strip the edges of which are tapered outwardly toward each other, so as to permit of their being sprung or slipped onto the edge of the cigar-box and be secured thereto, and this clamp is connected to the cover by hinges $f$, and in the present instance the bottom $A'$ is indented slightly at $A^3$ to bring the inner surface of the clamp in a plane with the bottom of the cover, so that it will fit squarely upon the top of the box on all sides thereof.

Such being the preferred construction of the detachable cover or moistener, its use will be be largely understood from what has been said, and when, for instance, a party purchases a box of cigars the usual lid is removed and the ends B' of the box, if they project above the front and back sides, as is common, are cut down, so that the upper portion of the box is of a uniform height, and my improved moistening-cover is then connected to the box by springing or forcing the clamp F onto one of the edges of one side of the box, when the cover will close tightly onto the box and preserve the cigars therein. As before stated, the indentation $A^3$ obviates the necessity of mortising the side of the box to receive the clamp and allows the cover to fit tightly. The indented portion $A^2$ will prevent the moistener from coming in direct contact with the cigars, which would tend to blister them.

The cover is made of metal, and preferably of aluminium or some non-corroding material, and the pad can be moistened with any fluid, preferably distilled water, or, if desired, any flavoring may be added to the water, and while the material of the cover is relatively light it will normally be held in position by its own weight.

The moistening-cover can be made in various shapes and sizes to fit the conventional forms of cigar-boxes, and as will readily be understood can be used indefinitely with any number of boxes, as when the cigars are exhausted the cover can be detached from the box and applied to a fresh box, and it may be ornamented or otherwise rendered attractive and desirable.

What I claim is—

A hollow cover for cigar-boxes having an inwardly-indented perforated portion on its under side, a moistening-pad supported within the cover on said indented portion, and means for movably connecting the cover to one side of an ordinary cigar-box to permit the under side of the cover to engage the upper edges of all the sides of the box to form a closure for the box and support the moistening-pad above the said edges, substantially as set forth.

In testimony whereof I have signed my name to this specification in the presence of two subscribing witnesses.

JOHN D. GRIFFEN.

Witnesses:
H. C. SMITH,
W. C. HENDRIE.